Patented July 3, 1951

2,558,793

UNITED STATES PATENT OFFICE 2,558,793

MIXTURES COMPRISING POLYACRYLO-NITRILE AND POLYVINYL FORMATE

Theodore E. Stanin and Joseph B. Dickey, Rochester, N. Y., assignors to Eastman Kodak Company, Rochester, N. Y., a corporation of New Jersey No Drawing. Application March 24, 1950,
Serial No. 151,808

14 Claims. (Cl. 260—30.2)

This invention relates to polymer compositions and to articles prepared therefrom.

Acrylonitrile has previously been used in the preparation of various polymers which are characterized by insolubility, or very low solubility, in many of the usual organic solvents. Many of these polymers, especially those containing high percentages of acrylonitrile, are further characterized by their lack of susceptibility to organic dyes, it being well known that fibers spun from polyacrylonitrile solutions can be passed through polyacrylonitrile dye baths without material amounts of the dye adhering to the fiber.

Attempts have been made to increase the dyeability of polyacrylonitrile fibers by interpolymerizing acrylonitrile with certain monomers whose polymers have an affinity for dyes. While this procedure does give polymer products from which fibers having good dyeing properties can be obtained, a serious drawback arises in many instances due to a substantial lowering of the softening point of the fiber. For example, while an interpolymer of acrylonitrile and vinyl formate containing large amounts of acrylonitrile in the polymer molecule can be drawn into fibers readily susceptible to dyes, the softening point of such fibers is too low for practical purposes, softening of the fibers being observed at temperatures of about 150° C. Interpolymers of acrylonitrile and vinyl formate have previously been suggested in Billig U. S. Patent 2,317,725, dated April 27, 1943, however, fibers prepared from the polymer compositions shown in this reference are too low in their softening temperature to be of practical use.

Other attempts have been made to increase the dyeability of polyacrylonitrile fibers by mixing with the polyacrylonitrile, before spinning, other polymeric materials which are dye-susceptible. This procedure likewise provides fibers having good dyeing properties, however, many of these fibers show a low softening point, and in addition many show segmentation into their individual components along their horizontal axis. For example, it can be demonstrated that mixtures of polyvinyl acetate and polyacrylonitrile, when dissolved in either N,N-dimethylformamide or N,N-dimethylacetamide in proportions varying from 15 to 50 per cent by weight of polyvinyl acetate based on the total weight of the mixed polyacrylonitrile and polyvinyl acetate, form grainy dopes which separate into two liquid layers on standing. This is also true of many other polymeric compounds, natural or synthetic, which are soluble in the above solvents. Fibers which form from these non-homogenous solutions or mixtures of polyacrylonitrile and polyvinyl acetate are too low in softening temperature to be of practical value, and also are subject to the defect of segmentation. This is not surprising because of the non-homogenous condition of the spinning solution and the fact that it is generally known that polyacrylonitrile is not compatible with many organic substances.

We have now made the unusual and valuable discovery that certain mixtures of polyacrylonitrile form stable solutions which do not separate into distinct layers on standing, and from which fibers of homogenous character can be spun. These fibers are characterized by a softening point higher than the interpolymers referred to above, and do not exhibit the segmentation defect shown by many of the fibers prepared from certain prior art mixtures comprising polyacrylonitrile.

It is, therefore, an object of our invention to provide polymer mixtures comprising polyacrylonitrile.

A further object is to provide homogenous solutions of these polymer mixtures comprising polyacrylonitrile.

Still another object is to provide fibers obtained from these homogenous solutions of these polymer mixtures. Other objects will become apparent from a consideration of the following description and examples.

According to our invention, we provide polymer mixtures comprising from 60 to 90 per cent by weight of polyacrylonitrile (i. e. a homopolymer of acrylonitrile) and from 40 to 10 per cent by weight of polyvinyl formate. Quite unexpectedly, we have found that polymeric compositions having the above range of components are excellently adaptable for the spinning of fibers in that they have a high softening point, and provide synthetic yarns showing no perceptible segmentation.

The polymer mixtures of our invention comprising polyacrylonitrile and polyvinyl formate can be dissolved in solvents, such as N,N-dimethylformamide and N,N-dimethylacetamide, to form stable solutions which do not show any tendency to separate. The lack of graininess in these solutions permits smooth, trouble-free extrusion through jets in the spinning of fibers, and permits storage of these solutions for any length of time prior to spinning without troublesome separation of the solution into two distinct layers. Especially useful compositions comprise those containing from 65 to 80% by weight of polyacrylonitrile and from 35 to 20 per cent by weight of polyvinyl formate. These compositions provide fibers which can be deeply dyed with acetate, viscose, acid, and basic dyes. The tenacity of the fibers obtained from these mixtures measures between 2.5 and 4.5 grams per denier depending on the spinning, drafting, and shrinking conditions, and the elongation is 16 to 25 per cent at break depending upon the shrinking conditions. The sticking points of the fibers obtained from these mixtures, as measured on a hot bar, lie around 200° C., and moisture absorption is 3 to 5 per cent at 60 per cent relative humidity, depending upon the amount of polyvinyl formate used in the mixture.

The polyacrylonitrile and polyvinyl formate resins can be mixed together by any of several methods. The two ingredients can be mixed together in a suitable mixer, such as a ball mill or Banbury mixer, or they can be dissolved in a mutual solvent (which is known to dissolve polyacrylonitrile), such as N,N-dimethylformamide, N,N-dimethylacetamide, ethylene carbonate, ethylene carbamate, N-methyl-2-pyrrolidone, γ-butyrolactone, etc. The ingredients can be mixed together before addition to the solvent, or each ingredient can be added separately to the solvent. Again, the ingredients can be added to the solvent to produce a slurry or dispersion which is agitated and heated to effect solution. The solubility of the resins in the solvents can be improved by incorporating a small amount of certain acids, such as sulfuric acid, phosphoric acid, oxalic acid, etc., as has been described in the copending applications Serial No. 49,654 (now U. S. Patent 2,503,244, issued April 11, 1950) and Serial No. 49,655 (now U. S. Patent 2,503,245, issued April 11, 1950), both filed September 16, 1948, of H. W. Coover, Jr., T. E. Stanin, and J. B. Dickey. The concentration of solids in the solvents can be varied depending on the use to which the composition is to be put; however, for most purposes it has been found that from about 10 to 40 per cent by weight of solids is adequate.

The following examples illustrate methods for utilizing the new compositions of our invention.

Example 1

8 g. of polyvinyl formate were dissolved in 300 cc. of N,N-dimethylformamide, and the solution was chilled to a temperature below 0° C. There were then added 20 g. of polyacrylonitrile which had been ground to 40 mesh size and which showed an inherent viscosity of 3.3. The mixture was then thoroughly shaken to obtain a smooth, uniform slurry. The slurry was slowly warmed to 100° C. and maintained at that temperature for 15 minutes, at the end of which time a smooth solution was obtained. This solution was free from graininess and gel particles, and after filtering under pressure, it was spun through a 30-hole jet into a water bath. The yarn which precipitated in the bath was led over delay rolls into a drying chamber heated to 120° C., then drafted 700 per cent at a temperature of 140° C., and allowed to shrink 20 per cent by passage through a chamber containing steam at 120° C. The dried yarn was wound on a spool by means of a cap spinner which imparted a slight twist of three turns per inch of yarn. The yarn so obtained measured 3.6 grams per denier and showed 22 per cent elongation at break. It did not show softening at temperatures below 190° C. on the hot bar, and it was deeply dyed by acetate and wool dyes.

Example 2

12 g. of polyvinyl formate were dissolved in 300 cc. of N,N-dimethylformamide and then 18 g. of polyacrylonitrile were dissolved in this solution according to the method described in Example 1 above. Yarn was then spun from the solution in the same manner set forth in Example 1. The yarn showed a tenacity of 3.2 grams per denier and an elongation of 20 per cent at break. It did not stick to the hot bar at temperatures below 185° C., and this yarn was also deeply dyed by acetate and wool dyes.

Example 3

4 g. of polyvinyl formate were dissolved in 330 cc. of N,N-dimethylformamide, and 26 g. of polyacrylonitrile were dissolved in this solution according to the method shown in Example 1. Yarn was then spun from this solution in exactly the same manner shown in Example 1. The yarn did not stick to the hot bar at temperatures below 220° C., although it was not dyed quite as deeply as the yarn obtained in Examples 1 and 2.

Solvents other than N,N-dimethylformamide can advantageously be used in the preparation of the synthetic fibers and yarns, including those solvents which have been listed above.

Instead of using the homopolymer of acrylonitrile or vinyl acetate, interpolymers of these individual monomers can be used, if desired. The vinyl monomer which is added to prepare the interpolymers should not comprise more than about 5 per cent of the monomeric mixture, since amounts higher than this figure provide interpolymers which give mixtures of too low a softening temperature. For the purposes of our invention, the simple homopolymers of acrylonitrile and vinyl formate have been found to be the most useful by far. Interpolymers of acrylonitrile containing about 5 per cent of some modifier such as vinyl acetate, vinyl formate, methyl acrylate, styrene, isopropenyl acetate, methyl α-methacrylate, acrylamide, etc., can be used. Interpolymers of vinyl formate containing not more than about 5 per cent of another monomer such as acrylonitrile, methyl acrylate, methyl α-methacrylate, acrylamide, vinyl acetate, etc., can also be used.

The polyacrylonitrile useful in practicing our invention can be prepared according to the process described in U. S. Patent 2,434,054, dated January 6, 1948, or U. S. Patent 2,296,403, dated September 22, 1942. Other processes which can be used are described in the copending applications, Serial No. 49,651, Serial No. 49,652, and Serial No. 49,653, all filed September 16, 1948, of T. E. Stanin, H. W. Coover, Jr., and J. B. Dickey.

The polyvinyl formate useful in our invention can be prepared by heating a mixture of polyvinyl alcohol and formic acid on a steam bath for about sixteen hours. The presence of about one per cent of chloroacetic acid in the mixture accelerates the rate of esterification. The product can be isolated by diluting the reaction mixture with water and thoroughly washing to remove the acid completely. The product can be purified by dissolving in 1,4-dioxane and precipitating the polymer in water. This precipitation step facilitates the removal of formic acid and improves the color of the product. Another method for preparing the polyvinyl formate useful in practicing our invention is described in U. S. Patent 2,079,068, dated May 4, 1937.

In the preparation of the polymer mixtures of our invention an amount of polyvinyl formate less than about 10 per cent by weight, based on the total weight of the mixture of polyacrylonitrile and polyvinyl formate, should not be used, since amounts lower than this figure provide mixtures from which fibers, which are not sufficiently susceptible to dyeing, are formed. On the other hand, mixtures containing more than about 40 per cent by weight of polyvinyl formate provide fibers which lose substantial amounts of the polyvinyl formate in washing. Both of these defects are avoided in the compositions of our invention described herein and those set forth in the claims appended hereto.

The polyvinyl formate and polyacrylonitrile mixtures of our invention are also useful in the preparation of sheets, films, tapes, etc.

What we claim as our invention and desire secured by Letters Patent of the United States is:

1. A resinous composition consisting of from 60 to 90 per cent by weight of polyacrylonitrile and from 40 to 10 per cent by weight of polyvinyl formate.

2. A resinous composition consisting of from 65 to 80 per cent by weight of polyacrylonitrile and from 35 to 20 per cent by weight of polyvinyl formate.

3. A resinous composition consisting of 70 per cent by weight of polyacrylonitrile and 30 per cent by weight of polyvinyl formate.

4. A resinous composition consisting of 60 per cent by weight of polyacrylonitrile and 40 per cent by weight of polyvinyl formate.

5. A resinous composition consisting of 87 per cent by weight of polyacrylonitrile and 13 per cent by weight of polyvinyl formate.

6. A solution of a resinous composition consisting of from 60 to 90 per cent by weight of polyacrylonitrile and from 40 to 10 per cent by weight of polyvinyl formate in a solvent selected from the group consisting of N,N-dimethylformamide, N,N-dimethylacetamide, ethylene carbonate, ethylene carbamate, N-methyl-2-pyrrolidone, and $\gamma$-butyrolactone.

7. A solution of a resinous composition consisting of from 60 to 90 per cent by weight of polyacrylonitrile and from 40 to 10 per cent by weight of polyvinyl formate in N,N-dimethylformamide.

8. A solution of a resinous composition consisting of from 65 to 80 per cent by weight of polyacrylonitrile and from 35 to 20 per cent by weight of polyvinyl formate in N,N-dimethylformamide.

9. A solution of a resinous composition consisting of from 60 to 90 per cent by weight of polyacrylonitrile and from 40 to 10 per cent by weight of polyvinyl formate in $\gamma$-butyrolactone.

10. A solution of a resinous composition consisting of from 65 to 80 per cent by weight of polyacrylonitrile and from 35 to 20 per cent by weight of polyvinyl formate in $\gamma$-butyrolactone.

11. A solution of a resinous composition consisting of from 60 to 90 per cent by weight of polyacrylonitrile and from 40 to 10 per cent by weight of polyvinyl formate in N,N-dimethylacetamide.

12. A solution of a resinous composition consisting of from 65 to 80 per cent by weight of polyacrylonitrile and from 35 to 20 per cent by weight of polyvinyl formate in N,N-dimethylacetamide.

13. A synthetic fiber comprising a resinous composition consisting of from 60 to 90 per cent by weight of polyacrylonitrile and from 40 to 10 per cent by weight of polyvinyl formate.

14. A synthetic fiber comprising a resinous composition consisting of from 60 to 80 per cent by weight of polyacrylonitrile and from 35 to 20 per cent by weight of polyvinyl formate.

THEODORE E. STANIN.
JOSEPH B. DICKEY.

No references cited.

Certificate of Correction

Patent No. 2,558,793                                           July 3, 1951

THEODORE E. STANIN ET AL.

It is hereby certified that error appears in the printed specification of the above numbered patent requiring correction as follows:

Column 6, line 34, for "60" read *65*;

and that the said Letters Patent should be read as corrected above, so that the same may conform to the record of the case in the Patent Office.

Signed and sealed this 16th day of October, A. D. 1951.

[SEAL]

THOMAS F. MURPHY,
*Assistant Commissioner of Patents.*